United States Patent [19]
Oami et al.

[11] Patent Number: 6,151,834
[45] Date of Patent: Nov. 28, 2000

[54] WINDOW DEVICE FOR USE IN A MOTOR VEHICLE

[75] Inventors: Kotaro Oami; Akiteru Nishio, both of Aichi-ken, Japan

[73] Assignee: Kabushiki Kaisha Toyoda Jidoshokki Seisakusho, Kariya, Japan

[21] Appl. No.: 09/123,293

[22] Filed: Jul. 28, 1998

[30] Foreign Application Priority Data

| Jul. 28, 1997 | [JP] | Japan | 9-201593 |
| Aug. 27, 1997 | [JP] | Japan | 9-231157 |
| Sep. 5, 1997 | [JP] | Japan | 9-241095 |

[51] Int. Cl.⁷ ...................................................... E05D 7/00
[52] U.S. Cl. .................... 49/402; 52/787.12; 296/216.06
[58] Field of Search ............................ 49/501, 381, 402; 296/216.09, 216.06, 901; 52/787.1, 787.12, 790.1

[56] References Cited

U.S. PATENT DOCUMENTS

| 3,972,558 | 8/1976 | Horn | 296/216.06 X |
| 4,595,230 | 6/1986 | Fettes | 296/216.06 X |
| 4,707,020 | 11/1987 | Enokida et al. | 296/901 X |
| 5,702,779 | 12/1997 | Siebelink, Jr. et al. | 428/14 |

FOREIGN PATENT DOCUMENTS

| 57-29414 | 2/1982 | Japan |
| 62-199525 | 9/1987 | Japan |
| 62-214011 | 9/1987 | Japan |
| 5104952 | 4/1993 | Japan | 296/901 |
| 6-106976 | 4/1994 | Japan |

*Primary Examiner*—Jerry Redman
*Attorney, Agent, or Firm*—Woodcock Washburn Kurtz Mackiewicz & Norris LLP

[57] ABSTRACT

A window device for use in a motor vehicle, has at least one pair of mutually threadingly engageable male member and female member, one of which is fixed into a boss formed integrally with a resin window panel, the other of which is threaded to the above one member through a hole formed in the reinforcing member, so that a reinforcing member is interposed between two engaging faces of the male and female members. Further, a shoulder portion is formed on either the male member or the female member for maintaining a constant interval between the two engaging faces of the male and female members.

5 Claims, 7 Drawing Sheets

WINDOW DEVICE FOR USE IN A MOTOR VEHICLE

BACKGROUND OF THE INVENTION

1. Field of the Invention

The present invention relates to a window device for use in a motor vehicle, in particular, to a window device for use as a sunroof in a motor vehicle.

2. Description of the Related Art

For a long time, it has been known that a window device for use as a sunroof in a motor vehicle is made of a polymethyl methacrylate resin or a polycarbonate resin, since this kind of material has a very small specific gravity and thus it is considered suitable for use as an appropriate material of a light transmissible member for manufacturing a light weight motor vehicle. Where a window of a motor vehicle is made of a synthetic resin, since a synthetic resin has a lower elastic modulus than a glass material, the resin material is usually combined with a reinforcing material along the edge portions of the window so as to obtain a desired reinforcement to prevent a possible bending and twisting.

However, there has been a problem with a window made of a synthetic resin. That is, a resin window panel has a comparatively large deformation amount caused by a thermal expansion due to a temperature change. To cope with the above problem, it has been suggested that a resin window panel be laterally movably combined with reinforcing members which are to be secured on the vehicle body so as to form a thermal expansion absorbing structure which is cable of absorbing a thermal expansion caused by a temperature change. This kind of thermal expansion absorbing structure may, for example, be found in Japanese Unexamined Utility Model Publication No. 5-16419.

As disclosed in Japanese Unexamined Utility Model Publication No. 5-16419, a reinforcing member having a U-shaped cross section is movably attached to outer edge portions of a resin window panel with the use of several bolt-nut connection assemblies loosely inserted in several holes formed through the resin window panel. Further, a pair of elastic members are interposed between the inner surfaces of the reinforcing member and the resin window panel to prohibit a possible rattling of the resin window panel and to partially absorb its thermal expansion.

However, with the above conventional structure, since several bolt-nut connection assemblies are used to clamp resin window panel and a pair of elastic members are interposed between the resin window panel and the reinforcing member, a capability of absorbing a thermal expansion of a resin window will vary from one window device to the other because of a fact that a clamping force of a bolt-nut connection assembly will vary depending on an elastic members. Moreover, there is also a possibility that a clamping force of a bolt-nut connection assembly will be different from one connection spot to the other. For this reason, during an operation of assembling a window device, it is necessary to pay attention to ensure that clamping forces on all connection spots are made identical, hence rendering the assembling operation too troublesome.

FIG. 18 illustrates a tilting type window device for use as a sunroof of a motor vehicle, while FIGS. 19 and 20 illustrate some functional elements attached to the resin window panel. A window panel 81 is attached to a sunroof housing by means of a hinge such that the window panel 81 may be easily opened or closed thereon. Further, the window panel 81 is fixed at a predetermined position by means of a locking handle 83. Here, both of the hinge 82 and the locking handle 83 are secured in positions by means of bolts 84 and nuts 85. Further, along an edge of the resin window panel 81, a reinforcing member 86 made of an iron or aluminum is bonded by an urethane adhesive agent 87 to obtain a desired reinforcement. In FIG. 18, an arrow FR shows a front direction of a motor vehicle.

However, since many functional elements and reinforcing members are arranged on the resin window panel 81, a light blocking area is increased, hence causing a decrease in a light transmissible area of the window panel 81.

Namely, in the above conventional structure, each of the hinge 82 and the locking handle 83 is fixed in position by inserting a bolt 84 in a hole 88 formed through the window panel 81 with a seal material 89 interposed therebetween, followed by tightening up a decorative nut 85.

In order to avoid an aesthetically uncomfortable feeling when looking at the window device from a vehicle room, some portions of the resin window panel 81 are made not transparent so as not to expose the hinge 82 and the locking handle 83 to the eyes of a person sitting in the vehicle room. However, it is extremely difficult for a decorative nut 85 not to appear on the upper surface of the resin window panel 81 because of its specific structure, hence resulting in an aesthetically uncomfortable feeling, and causing an uncomfortable wind sound due to the protruding structure of a nut 85 when the vehicle is running at a high speed.

In addition, since the above discussed structure needs to employ a sealing member 89 to seal the bolt hole 88, such sealing member 89 will gradually not give a satisfactory sealing effect with the passing of time, thus resulting in a trouble that rain water may invade through the bolt hole into the inner surface of the resin window panel.

SUMMARY OF THE INVENTION

In view of the above discussed problems associated with the above mentioned prior art, it is an object of the present invention to provide an improved window device for use in a motor vehicle which is easy to be assembled.

It is another object of the present invention to provide an improved window device for use in a motor vehicle having a larger light transmissible area.

It is a further object of the present invention to provide an improved window device for use in a motor vehicle, which gives a person a good aesthetic feeling and which is capable of preventing a generation of an uncomfortable wind sound and an invasion of rain water.

According to a first aspect of the present invention, there is provided a window device for use in a motor vehicle, comprising: a resin window panel having at least one boss portion formed vertically thereon; a reinforcing member having at least one through hole; at least one pair of mutually threadingly engageable male member and female member, one of which is fixed in the at least one boss formed integrally with the resin window panel, the other of which is threaded to the above one member through the hole formed in the reinforcing member, so that the reinforcing member is interposed between two engaging faces of the male and female members; a shoulder portion being formed on either the male member or the female member for maintaining a constant interval between the two engaging faces of the male and female members.

According to a second aspect of the present invention, there is provided a window device for use in a motor vehicle, comprising: a transparent resin window panel for use in a motor vehicle; a reinforcing member fixed on one side of the resin window panel facing a vehicle room; functional elements attached right above or under the reinforcing member on the above one side of the resin window panel facing a vehicle room.

According to a third aspect of the present invention, there is provided a window device for use in a motor vehicle, comprising: a resin window panel having at least one boss protruded on one side thereof facing a vehicle room; functional elements attached to the at least one boss of the resin window panel by means of bolts.

DESCRIPTION OF THE PREFERRED EMBODIMENTS

Embodiment 1

Figure 1:
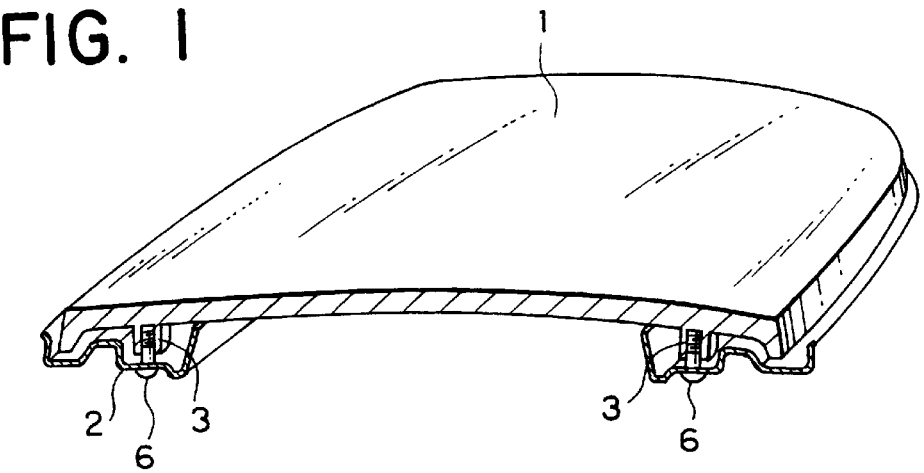
FIGS. 1 and 2 are a perspective sectional view and a partial sectional view indicating an automobile window device according to a first embodiment of the present invention, respectively.

A first embodiment of the present invention will be described with reference to FIGS. 1 and 2.

The present invention may be applied to a window device serving as a sunroof in a motor vehicle. Referring to FIG. 1, a resin window panel 1 is formed into a rectangular shape with its longitudinal axis arranged in a lateral direction of the vehicle. A reinforcing member 2, which is made of an iron material and formed into a square frame structure, is arranged on the inner surface of the resin window panel 1 adjacent to the outer edge thereof. With the use of the reinforcing member 2, the resin window panel 1 is sufficiently reinforced so that a possible bending or twisting of the resin window panel 1 may be prevented or at least prohibited. The reinforcing member 2 itself is connected to the main body of a motor vehicle (not shown). Where the resin window panel 1 is used as a sunroof, the reinforcing member 2 is required to be made such that its cross section has a sectional secondary moment (geometrical moment of inertia) which is useful to resist a detaching force acting upon the reinforcing member 2 while the motor vehicle is running at a high speed.

The resin window panel 1 and the reinforcing member 2 are combined together by means of several connection spots 6 arranged at a predetermined interval along the entire circumference of the window panel. In detail, each connection spot 6 includes a hollow cylindrical boss 3 formed integrally with the resin window panel 1, a shouldered bolt 5, a collared nut 4.

Figure 2:
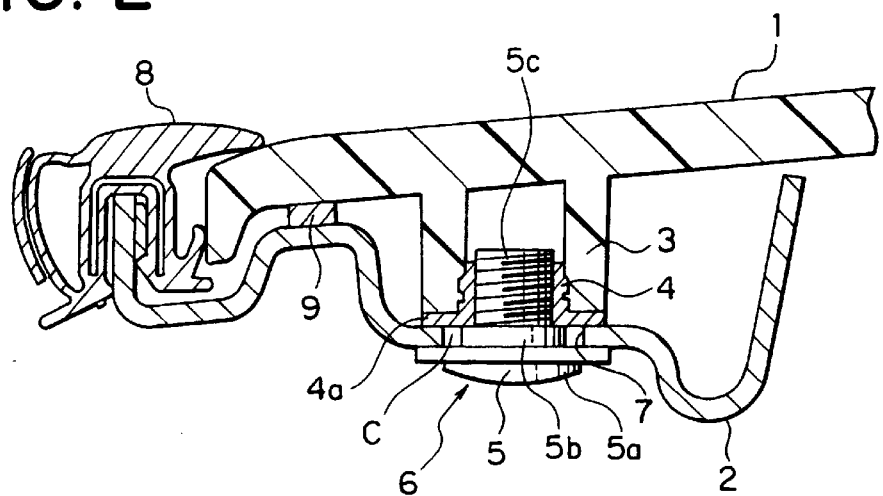

Referring to FIG. 2, a plurality of hollow cylindrical boss 3 are formed on the inner surface of the resin window panel 1. In each hollow cylindrical boss 3 is inserted a collared nut 4 threaded and fixed therein. The collared nut 4 has a collar portion 4a having a diameter which is the same as the outer diameter of the hollow cylindrical boss 3. Further, the collar portion 4a is so formed and dimensioned that it is able to engage with the whole end face of the boss 3. However, the insertion of the collared nut 4 into the hollow cylindrical boss 3 may be completed during a process for the formation of the resin window panel 1.

Each shouldered bolt 5 includes a head portion 5a, a threaded portion 5c, and a shoulder portion 5b which is formed between the head portion 5a and the threaded portion 5c. Such a shouldered bolt 5 is adapted to insert into the hollow cylindrical boss 3 through a hole 7 formed on the reinforcing member 2, and may be tightened up on a collared nut 4. In this way, the reinforcing member 2 is clamped between the head portion 5a of the shouldered bolt 5 and the collar portion 4a of the collared nut 4, thereby rendering the reinforcing member 2 to be combined with the resin window panel 1.

The shoulder portion 5b of the shouldered bolt 5 has a diameter which is smaller than that of the head portion 5a but larger than that of the threaded portion 5c, and has an axial thickness which is slightly larger than the thickness of the reinforcing member 2.

In this manner, in a process when the shouldered bolt 5 is being threaded into the nut 4, since an annular end face of the shoulder portion 5b of the bolt 5 is contacted and stopped by an end face of the nut 4, the collar portion 4a of the nut 4 and the head portion 5a of the shouldered bolt 5 will be separated from each other by an interval which is slightly larger than the thickness of the reinforcing member 2 interposed therebetween.

For this reason, if the diameter of the hole 4 of the reinforcing member 2 is set to be larger than that of the outer diameter of the bolt shoulder portion 5b so that a gap C is formed therebetween, the resin widow 1 is allowed to have a relative movement (caused due to a thermal expansion) within a range of the gap C. This time, an interval between the end face of the nut 4 and the end face of the bolt head 5a should be set such that the resin window panel is allowed to have a free and relative movement when there is a thermal expansion. In FIG. 2, reference numeral 8 is a weather strip attached on the entire outer edge of the reinforcing member 2, and reference numeral 9 is a seal interposed between the resin window panel 1 and the reinforcing member 2.

With the use of the above structure, the shoulder portion 5b of the shouldered bolt 5 is useful for maintaining constant a predetermined interval between the head portion 5a of the bolt 5 and the collar portion 4a of the nut 4. In this way, as long as an axial length (thickness) of the shoulder portion 5b is set properly, the resin window panel 1 and the reinforcing member 2 may be properly combined together so as to ensure a desired function of absorbing a thermal expansion of the resin window panel 1 without causing any rattling therebetween. Namely, with the use of the first embodiment of the present invention, since only a simple operation is needed to engage a shouldered bolt 5 into a collared nut 4, it is easy to obtain a desired combination between the resin window panel 1 and the reinforcing member 2 without causing any problem such as that thermal expansion absorbing function will be different from one connection spot to another.

Further, in the first embodiment, since the collar portion 4a of the collared nut 4 is useful for protecting the end face of the hollow cylindrical boss 3 from any possible damage, it is sure that when the resin window panel 1 has a relative movement caused by a thermal expansion, a direct or concentrated load may be prevented from occurring on the end face of the hollow cylindrical boss 3.

In general, if the resin window panel 1 is made of a polycarbonate resin, there will be a problem that its durability becomes low and cracking will occur if a solvent is spilled thereon. Such kind of solvent is contained in a liquid detergent which is usually for washing window glass of a motor vehicle. Therefore, a structure that the end face of the hollow cylindrical boss 3 is protected by the collar portion 4a of a collared nut 4, is useful not only for avoiding a direct or concentrated load on the end face of the hollow cylindrical boss 3, but also useful for preventing a solvent from spilling on to the hollow cylindrical boss 3. In this way, it is possible for an automobile resin window having a function of absorbing a thermal expansion to avoid cracking and to avoid durability deterioration, so as to improve its reliability.

Further, according to the present embodiment, since the reinforcing member 2 is attached on the inner surface of the resin window 1, a visible outer appearance of the window device will not be unfavorably influenced. In addition, since the reinforcing member 2 fixed on the inner surface of the resin window panel 1 may be covered up by an appropriate decorative material, it is sure to obtain an aesthetically comfortable feeling when looking at the window device.

Embodiment 2

A second embodiment of the present invention will be described with reference to FIG. 3.

The second embodiment is almost the same as the first embodiment except the following differences.

Figure 3:
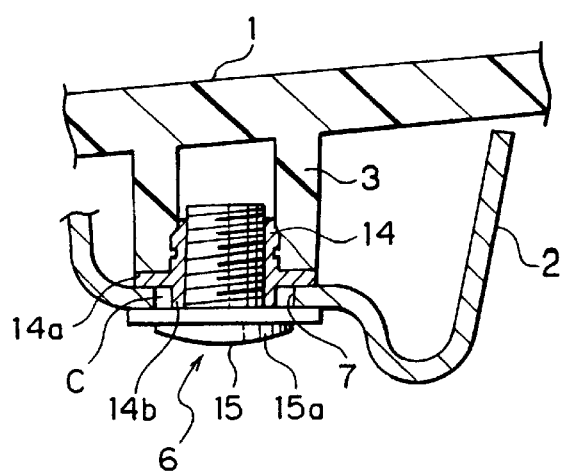
FIGS. 3 to 7 are partial sectional views indicating automobile window devices according to second to sixth embodiments of the present invention, respectively.

Namely, referring to FIG. 3, instead of forming a shoulder portion on a bolt 15, a shoulder portion 14b and a collar portion 14a are formed on the nut 14.

With the use of the second embodiment of the present invention, when the bolt 15 is threaded into the nut 14, the shoulder portion 14b will engage on the inner face of the head 15a. Accordingly, an interval between the collar portion 14a of the nut 14 and the head 15a of the bolt 15 may be easily made slightly larger than the thickness of the reinforcing member 2.

Embodiment 3

A third embodiment of the present invention will be described with reference to FIG. 4.

The third embodiment is almost the same as the first embodiment except the following differences.

Figure 4:
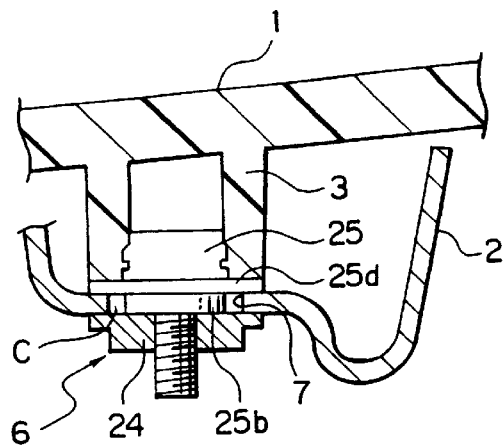

Namely, referring to FIG. 4, a shouldered bolt 25 is inserted into the hollow cylindrical boss 3, a collar portion 25d for protecting the end face of the hollow cylindrical boss 3 is formed on the shouldered bolt 25.

With the use of the third embodiment of the present invention, when the bolt 25 is threaded into the nut 24, a shoulder portion 25b of the bolt 25 will engage on the end face of the nut 24. Accordingly, an interval between the nut 24 and the collar portion 25d of the bolt 25 may be easily made slightly larger than the thickness of the reinforcing member 2, the end face of the hollow cylindrical boss 3 may be protected by the collar portion 25d of the bolt 25.

Embodiment 4

A fourth embodiment of the present invention will be described with reference to FIG. 5.

The fourth embodiment is almost the same as the third embodiment except the following differences.

Figure 5:
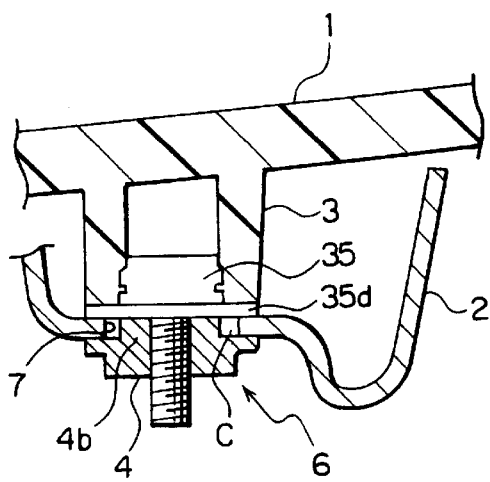

Namely, referring to FIG. 5, a shouldered bolt 35 is inserted into the hollow cylindrical boss 3, a shoulder portion 34b is formed on a collared nut 34.

With the use of the fourth embodiment of the present invention, when the collared nut 34 is threaded on to the bolt 35, the end face of shoulder portion 34b of the nut 34 will engage with a collar portion 35d of the bolt 35. Accordingly, an interval between an engaging face of the nut 34 and the collar portion 35d of the bolt 35 may be easily made slightly larger than the thickness of the reinforcing member 2, the end face of the-hollow cylindrical boss 3 may be protected by the collar portion 35d of the bolt 35.

Embodiment 5

A fifth embodiment of the present invention will be described with reference to FIG. 6.

The fifth embodiment is almost the same as the first embodiment except the following differences.

Figure 6:
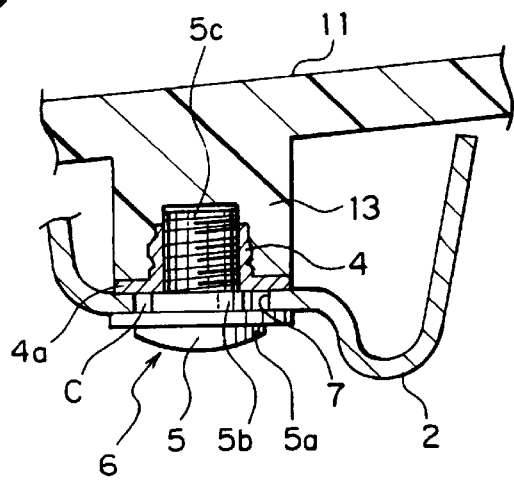

Namely, referring to FIG. 6, a collared nut 4 is directly inserted into a solid (not hollow) cylindrical boss 13. However, after such a solid cylindrical boss 13 is formed, it is preferable that some portions of the outer surface of the resin window panel 11 are covered by a kind of protective material layer in order to prevent occurrence of some minor cracks.

Embodiment 6

A sixth embodiment of the present invention will be described with reference to FIG. 7.

The sixth embodiment is almost the same as the sixth embodiment except the following differences.

Figure 7:
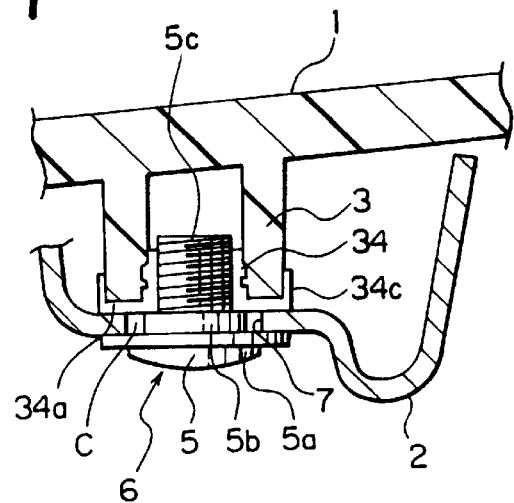

Namely, referring to FIG. 7, a hollow cylindrical structure 34c for partially covering the side wall of a hollow cylindrical boss 3, is integrally formed on the front end of a collar portion 34a of a nut 34. With the use of such structure, since the side wall of the hollow cylindrical boss 3 is properly covered by the hollow cylindrical structure 34c, it is sure to prevent a washing solvent from contaminating the boss 3 even if the resin window panel 1 has had a slight movement due to a thermal expansion.

In fact, each of the second through sixth embodiments of the present invention has the same effect as that obtainable in the above first embodiment.

Although it has been described in each of the above embodiments that a collar portion is provided on a nut (4, 14, 24 or 34) or on a bolt (5, 15, 25, 35) to protect the end face of a boss (3 or 13), it is also possible that such a collar portion is omitted and that a reinforcing member 2 is directly connected with the boss.

Further, it has been described in the above embodiments that a structure of the present invention is used in a sunroof of a motor vehicle, in fact it is also possible that the structure of the present invention may be used in some other kinds of an automobile window, such as a rear quarter window or a rear window.

Embodiment 7

Figure 8:
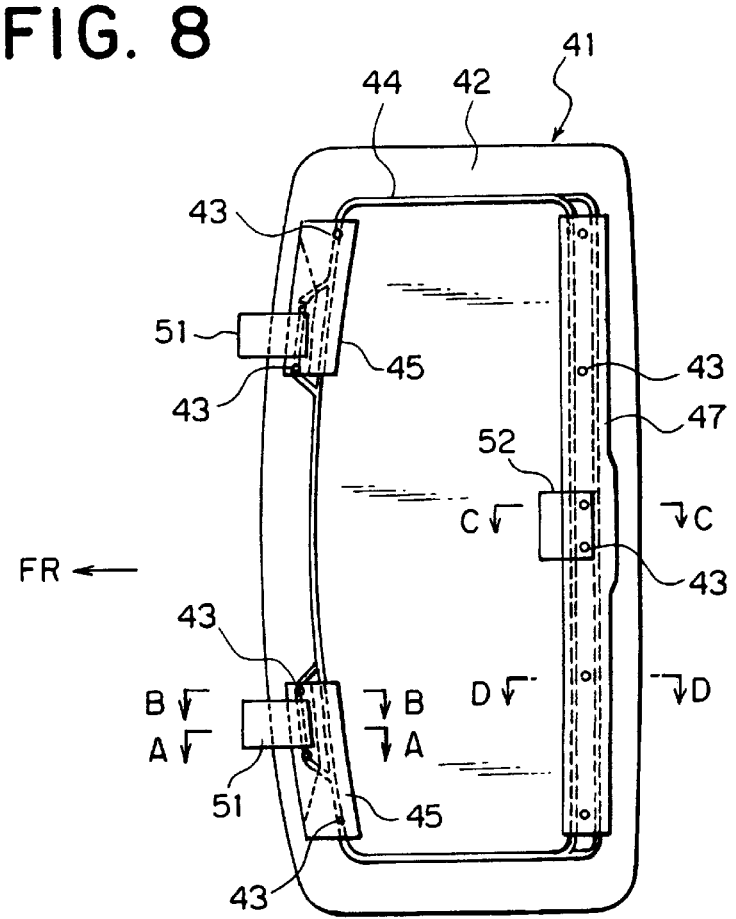
FIG. 8 is a bottom view from a vehicle room of the automobile window device according to a seventh embodiment of the present invention.

A seventh embodiment of the present invention will be described with reference to FIG. 8, which is a plane view of a window assembly when viewed form a vehicle room. In FIG. 8, an arrow FR indicates a forwardly proceeding direction of an automobile vehicle. As shown in the drawing, an automobile resin window is used as a tilting type window such as a sunroof. In FIG. 8, reference numeral 41 is a resin window made of a transparent polycarbonate resin by means of injection molding. In detail, the resin window 41 includes a rectangular resin window panel 42, a plurality of cylindrical bosses 43 formed integrally with the resin window panel 42 for attaching other parts or elements, and a reinforcing rib strip 44.

As shown in FIG. 8, the reinforcing rib strip 44 is formed on one side of the resin window panel facing the vehicle room, along and adjacent to the outer circumference of the panel. In particular, the reinforcing rib strip 44 is arranged to pass through positions where a sufficient rigidity is required, such as the left and right portions (where hinges 51 are located) on the front side, and the rear side where a locking handle 52 is located.

Further, in order to more exactly reinforce the resin window panel 42, a pair of front reinforcing members 45 made of an iron or aluminum are provided to cover the reinforcing rib strip 44, located right and left on the front side on the above surface of the window panel facing the vehicle room. Another reinforcing member 47 which is of an elongated form and is also made of an iron or aluminum, is provided on the rear side to cover the entire length of the reinforcing rib strip 44 on the rear side of the window panel 41.

Figure 9:
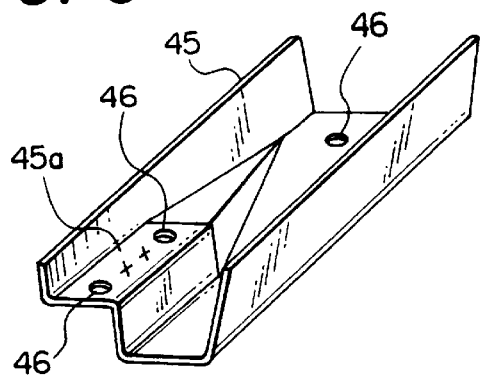
FIGS. 9 and 10 are perspective views indicating a front reinforcing member and a rear reinforcing member used in the seventh embodiment, respectively.

As shown in FIG. 9, each of the right and left reinforcing members 45 on the front side is formed to have generally U-shaped cross section. A flat surface 45a for mounting a hinge is formed on the front side of each reinforcing member 45, so that a hinge 51 (FIG. 8) may be connected through one side thereof to the flat surface 45a by means of spot welding. Further, a plurality of through holes 46 (for connection) are formed on any optional positions on the bottom and on the flat surface 45a of each reinforcing member 45.

Figure 10:
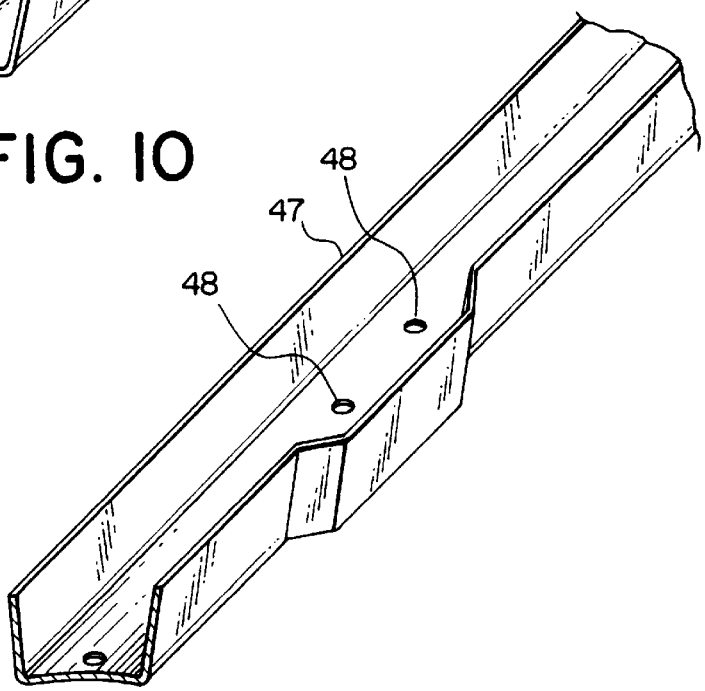
Figure 11:
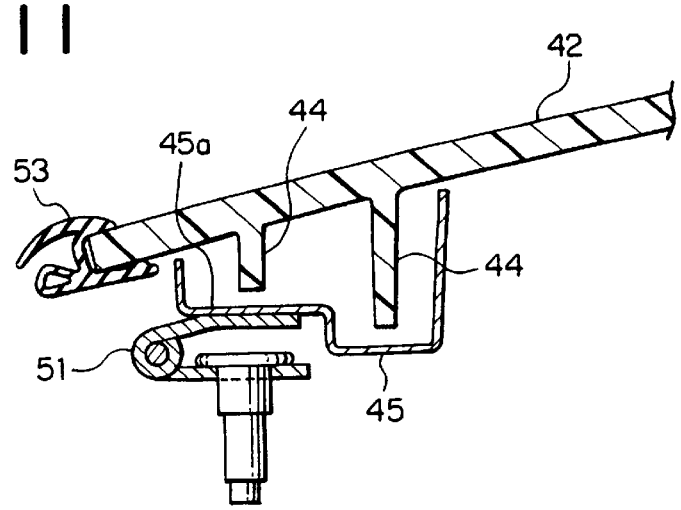
FIGS. 11 to 14 are cross sectional views taken along lines A—A, B—B, C—C and D—D in FIG. 8, respectively.

On the other hand, as shown in FIG. 10, a rear reinforcing member 47 is also formed to have a generally U-shaped cross section, and have a length that is longer enough to cover up the rear reinforcing rib strip 44 along the entire length thereof. Similarly, there are formed a plurality of through holes 48 (for connection) at an appropriate interval from each other on the bottom of the rear reinforcing member 47.

Figure 12:
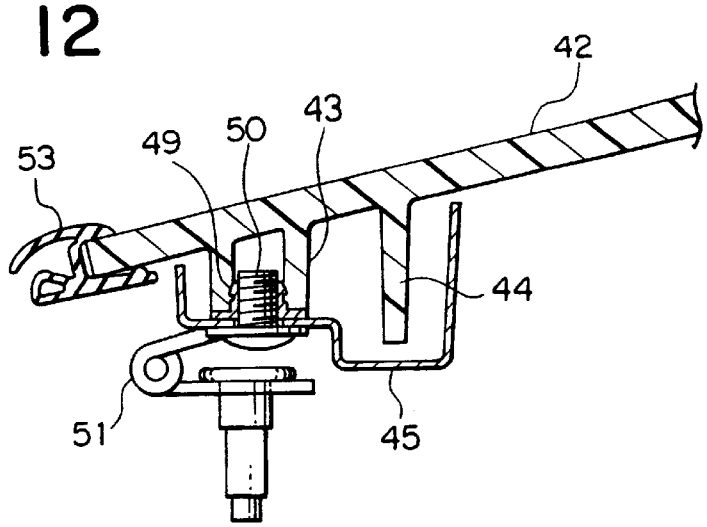
Figure 13:
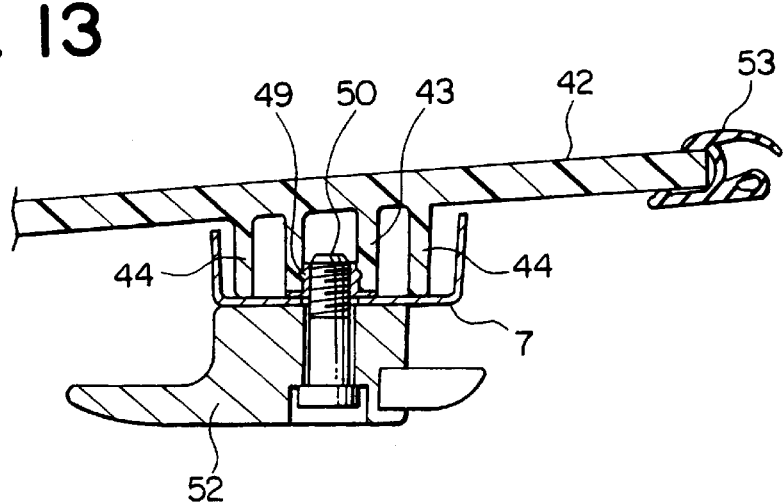
Figure 14:
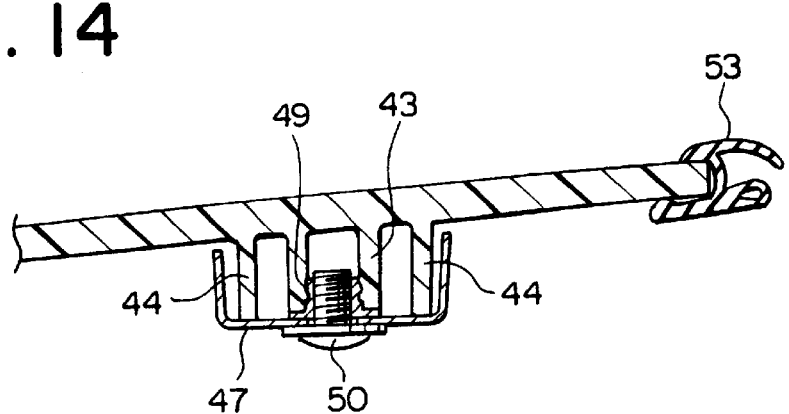
Figure 15:
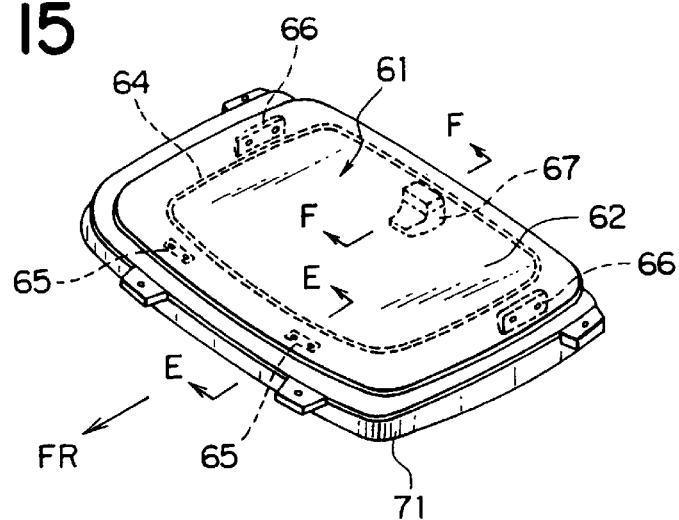
FIG. 15 is a perspective view indicating an automobile window device according to an eighth embodiment of the present invention.

Referring to FIGS. 12, 13, 14, each of the reinforcing members 45 and 47 is connected to at least one hollow cylindrical boss 43, by means of a bolt 50 threaded into a collared nut 49 which has in advance been heat-pressed into the hollow cylindrical boss. In more detail, FIG. 13 illustrates how a front reinforcing member 45 is connected with a hollow cylindrical boss 43. FIGS. 14 and 15 illustrate how a rear reinforcing member 47 is connected with a hollow cylindrical boss 43.

In further detail, as shown in FIG. 12, when a front reinforcing member 45 is connected with a hollow cylindrical boss 43 by means of a bolt 50 and a nut 49, since either side of a hinge 51 is provided with a connector, it is sure to obtain an effect of prohibiting a possible twisting on the hinge 51 and the front reinforcing member 45.

On the other hand, as shown in FIG. 13, the rear reinforcing member 47 is connected to a hollow cylindrical boss 43 with the use of a bolt 50 and a nut 49, both of which are at the same time used for fixing a locking handle 52 in position.

The resin window panel 42 is connected through a hinge 51 to a sunroof (not shown) secured on the vehicle body, in a manner such that it may be easily opened and closed thereon, and may be fixed on a closed position by means of the locking handle 52. In FIGS. 13 and 14, a reference numeral 53 is a weather strip attached along the entire outer edge of the resin window panel 42.

In this seventh embodiment of the present invention, on the inner surface of the resin window panel 42 is provided front reinforcing members 45, under each of which is further provided a hinge 51 by means of spot welding. Further provided on the inner surface of the resin window panel 42 is the rear reinforcing member 47 under which is provided a locking handle 52. Thus, with the use of the structures of FIGS. 12–14 in which several functional elements are arranged one above another, a space required for attachment on one plane is greatly reduced as compared with prior art where reinforcing members and functional elements are arranged side by side. Therefore, a light transmissible area on the resin window panel may be increased at least by an area that is equal to those formerly occupied by the hinges 51 and the locking handle 52 in a prior art.

Further, according to the seventh embodiment of the present invention, since it is possible to dispense with some bolts and nuts which are otherwise necessary for attaching hinges 51 and locking handles 52, the number of elements and working hours for assembling the window device may be greatly reduced, thereby improving an efficiency for assembling operation and lowering a production cost.

In addition, since the resin window panel 42 is reinforced not only by the reinforcing rib strip 44, but also by the front and rear reinforcing members 45 and 47, it is sure to obtain a desired rigidity to prevent a possible bending or twisting. By the way, since the reinforcing rib strip 44 and the hollow cylindrical bosses 43 are covered up by the front and rear reinforcing members 45, 47, it is easy for a person to avoid an aesthetically uncomfortable feeling when looking at the window device from a vehicle room.

Figure 18:
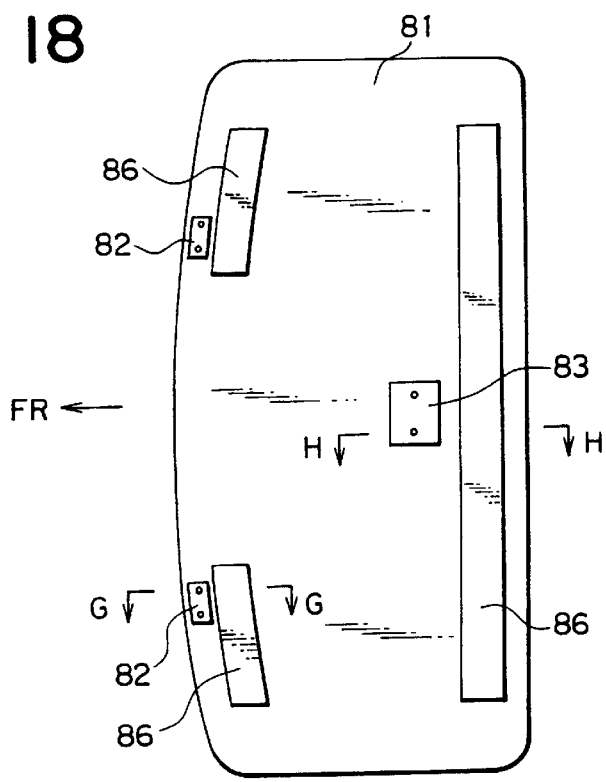
FIG. 18 is a bottom view from a vehicle room indicating a conventional automobile window.

Different from the present invention, in a conventional window device shown in FIG. 18, since a locking handle 83 is located inside a rear reinforcing member 86, a distance between a fixing point of a locking member on the vehicle body and a locking point of the locking handle 83 is relatively long, these locking members have only low rigidities when the resin window panel 81 is in its closed position.

In contrast, in the present invention, since the locking handle 52 is located in a position right under the rear reinforcing member 47 and such an arrangement enables the locking handle 52 to get closer to the rear side of the resin window panel, a distance between a fixing point of a locking member on the vehicle body and a locking point of the locking handle 52 is relatively short, these locking members can have high rigidities when the resin window panel 42 is in its closed position.

Figure 20:
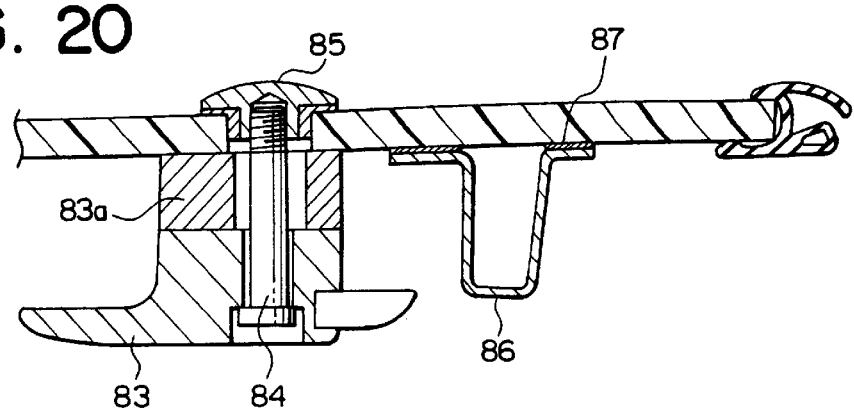

Further, in the seventh embodiment of the present invention, since each hollow cylindrical boss 43 is integrally formed on the inner surface of the resin window panel 42, and since a bolt 50 and a nut 49 are directly combined with a boss 43, it is allowable to dispense with a spacer 83a (FIG. 20) which is otherwise necessary in a conventional window device, thereby reducing the number of the parts necessary to form the window device and thus simplifying the assembling operation.

In addition, with the use of the structure obtained according to this seventh embodiment, since no attachment members are exposed on the outer surface of the resin window panel 42, it is sure to avoid an aesthetically uncomfortable feeling when looking at the window device. Further, since there are no protrudingly formed members attached on the outer surface of the resin window panel 41, an uncomfortable sound would not happen even if the motor vehicle is running at a high speed, and a trouble of rain water invasion may be prevented.

Although it has been described in the seventh embodiment that a nut 49 is heat-pressed into a hollow cylindrical boss 43, it is also possible that a bolt 50 may be heat-pressed into the same position. Further, although it has been explained in the above description that a structure of the seventh embodiment is useful for making a tilting type window device such as a sunroof of a motor vehicle, in fact it is also useful for making a sliding type sunroof, a rear quarter window or a rear window for use in a motor vehicle.

By the way, some functional items such as the hinges 51 and the locking handle 52 used in the seventh embodiment are nothing but an example for the purpose of description. In fact, instead of attaching a hinge 51 by means of spot welding, it is also possible that such hinge 51 may be attached to its predetermined position using the same method which is utilized for fixing the locking handle 52. In addition, a material for forming the resin window panel 41 is not necessarily a polycarbonate resin, it is also possible to use other kinds of synthetic resin as long as it is a transparent resin.

Embodiment 8

An eighth embodiment of the present invention will be described with reference to FIGS. 15–17. As shown in FIG. 15, the eighth embodiment relates to a tilting type window device such a sunroof for use in a motor vehicle. In detail, a resin window 61 is made of a polycarbonate resin by means of molding injection, and it includes a rectangular resin window panel 62, a plurality of hollow cylindrical bosses 63, a reinforcing rib strip 64. The resin window panel 62 is formed into a roof shape having a gently curved surface.

Referring again to FIG. 15, a pair of hinges 65 are provided right and left on the front side of the resin window panel 62, a pair of guide link members 66 are also provided right and left on the resin window panel 62 close to the rear side thereof, a locking handle 67 is provided in the middle on the rear side of the window panel 62.

One or more hollow cylindrical bosses 63 are formed on the inner surface of the resin window panel 61 in positions which would not hamper the provision of the hinges 65, guide link members 66 and the locking handle 67. In particular, if a plurality of hollow cylindrical bosses are formed, the plurality of bosses are protrudingly formed on the inner surface of the resin window panel 62 in a manner such that their axial lines are parallel with one another.

In order to avoid an aesthetically uncomfortable feeling when looking at the window device, some portions of the resin window panel 62 in which the hinges 65 and the guide link members 66 and the locking handle 67 are to be positioned, are made opaque (not transparent). In more detail, these portions of the resin window panel may be coated with a hard coating of a silicon material. Further, in order to more exactly ensure a opaque effect, an opaque yellow film may be interposed between the resin window panel and the hard coating.

Figure 16:
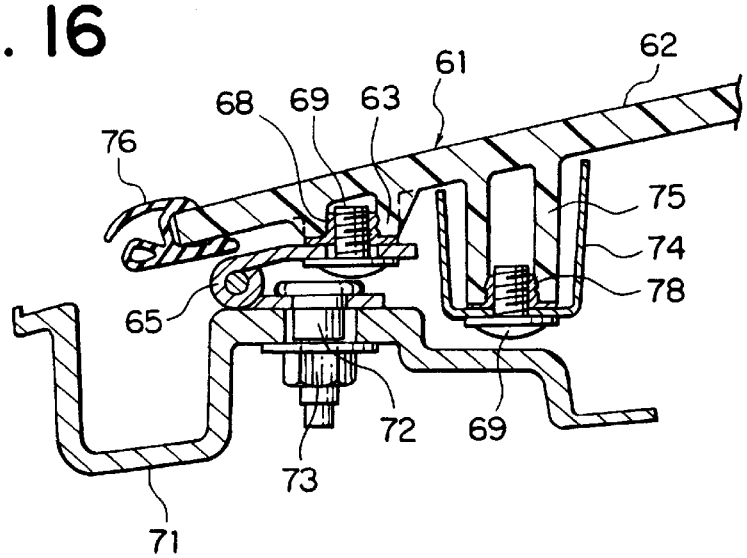
FIGS. 16 and 17 are cross sectional views taken along lines E—E and F—F in FIG. 15, respectively.
Figure 17:
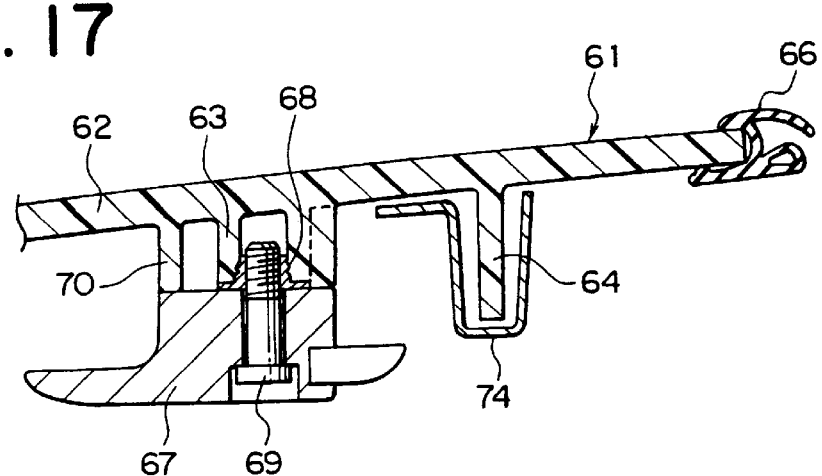

Referring to FIGS. 16 and 17, each collared nut 68 is heat-pressed into a hollow cylindrical boss 63, and a functional element is connected to the nut 68 by means of a bolt 69. FIG. 16 is a sectional view indicating a condition where a hinge 65 is attached in position, FIG. 17 is another sectional view indicating a condition where a locking handle 67 is combined with a hollow cylindrical boss 63. However, in a case where a locking handle 67 is installed, it is preferred that an engaging surface of the locking handle 67 be brought into contact with a rib 70 formed adjacent to the hollow cylindrical boss 63, thereby achieving a more stabilized attachment for the locking handle 67.

The resin window panel 61, after being formed into the above-described structure, is installed through the hinges 65 and the guide link members 66 onto a sunroof housing 71, in a manner such that it may be easily opened or closed and may be fixed in its closed position by means of the locking handle 67. However, the attachment of the hinges 65 and the guide link members 66 to the sunroof housing 71 may be completed with the use of bolts 72 and nuts 73, as shown in FIG. 16 (the guide link members 66 are not shown).

As shown in FIG. 16, a reinforcing rib strip 64 is formed integrally with the inner surface of the resin window panel 62, along the entire circumference thereof. Further, an elongate reinforcing member 74, which is made of an iron or aluminum and has a U-shaped cross section, is provided to completely or partially cover the reinforcing rib strip 64. Moreover, referring to FIG. 16, in several positions along the reinforcing rib strip 64 there are formed several hollow cylindrical bosses 75. Heat-pressed into each hollow cylindrical boss 75 is a collared nut 68, then a bolt 69 is threaded into the nut 68 so as to fix a reinforcing member 74 in position.

Similar to the above hollow cylindrical bosses 63. these hollow cylindrical bosses 75 are positioned on the inner surface of the resin window panel 62 in a manner such that their axial lines are parallel with one another. In FIGS. 16 and 17, reference numerals 76 and 66 are elongate weather strips engaged on and along the outer circumference of the resin window panel 62.

In the structures shown in FIGS. 16–17, two kinds of hollow cylindrical bosses 63 and 75 are formed on the inner surface of the resin window panel 62, a collared nut 68 is heat-pressed into each hollow cylindrical boss, then hinges 65 and locking handles 67 and a reinforcing member 74 are connected in their predetermined positions by means of bolt 69. With the use of the structure according to the eighth embodiment shown in FIGS. 15–17, it is sure that no attachment elements appear on the outer surface of the resin window panel, thus it is possible to avoid an aesthetically uncomfortable feeling when looking at the window device. Further, since there are no protrudingly formed members on the outer surface of the resin window panel 61, an uncomfortable sound would not happen even if the motor vehicle is running at a high speed, and a trouble of rain water invasion may be prevented.

However, in a conventional window device shown in FIGS., 19 and 20, some functional elements are connected to the inner surface of a resin window panel by virtue of bolts 84 and nuts 85 both of which are engaged in holes formed through the resin window panel. It is understood from both FIG. 16 and FIG. 17 that in a conventional window device a connecting direction for attaching a functional element onto the resin window panel is always perpendicular to the window panel itself. Thus, if a resin window panel has been formed into a curved surface, a plurality of functional elements have to be attached to the resin window panel in different connecting directions.

In contrast, with the use of the eighth embodiment of the present invention, since two kinds of hollow cylindrical bosses 63 and 75 are protrudingly formed in parallel with one another on the inner surface of a resin window panel, the directions for attaching individual collared nuts 68 and for engaging individual bolts 69 will be made same for all nuts and bolts irrespective of the resin window panel is a flat surface or a curved surface. Thus, it is possible to use a robot to perform an automated operation for assembling a window device, attaching individual collared nuts 68 and engaging individual bolts 69 in a desired manner.

Moreover, since the end faces of all the hollow cylindrical bosses 63 are parallel with one another, all the hinges 65 may be formed into a common shape and a common size so that they may be used in other automobile vehicles of different type, with only one need of changing the height of hollow cylindrical boss if necessary. However, in a conventional window device, although it is possible to use a spacer to adjust a height for attaching a functional element, it is impossible for all the hinges 65 to be made into a common shape and a common size, and it is not possible either to reduce the number of necessary elements.

In general, since a resin window panel has a lower rigidity than a glass window panel, it is preferred that a reinforcing rib strip 64 is provided to increase its rigidity so as to prevent a possible bending or a twisting. On the other hand, if the reinforcing member 64 has too large a thickness, there will occur another problem called "pulling" on the outer surface of the resin window panel. For this reason, it is difficult to expect a highly satisfactory reinforcement effect because of a limitation in the thickness of a reinforcing rib strip 64.

With the use of the eighth embodiment of the present invention, the provision of a reinforcing member 74 is useful for further reinforcing the resin window panel 61, thereby eliminating the above problem (a limitation in the thickness of a reinforcing rib strip 64). Further, since the reinforcing member 74 is used to cover up the reinforcing rib strip 64, it is sure to avoid an aesthetically uncomfortable feeling when looking at the window device from the vehicle room.

Namely, with the eighth embodiment of the present invention, since the reinforcing member 74 serves to cover up the reinforcing rib strip 64, it is allowed to dispense with other covering elements.

Although it has been described in the present embodiment that the collared nuts 68 are heat-pressed into the hollow cylindrical bosses 63, it is also possible that the collared nuts 68 may be located sufficiently far away from the resin window panel 62, so as to prevent the outer appearance of the window device from being affected by any possible thermal expansion. In particular, since the hollow cylindrical boss 75 is located within the reinforcing cover 74, it is allowed to have a long distance between the collared nut 68 and the resin window panel 62 (FIG. 16).

Figure 19:
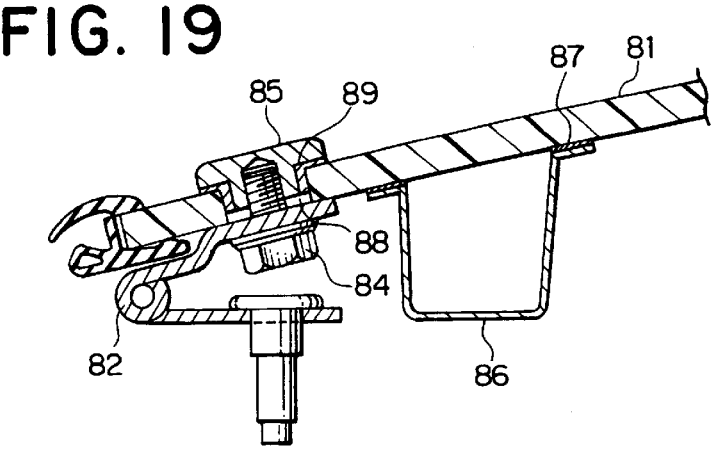
FIGS. 19 and 20 are cross sectional views taken along lines G—G and H—H in FIG. 18, respectively.

Further, since rain water invasion would not occur, it is allowed to dispense with a seal 89 (FIG. 19) which is otherwise necessary in a conventional window device. Moreover, since a locking handle 67 may be directly connected to a hollow cylindrical boss 63, it is possible to dispense with a spacer 83a (FIG. 20) which is needed in a prior art device, thereby reducing the number of necessary parts for forming the window device.

As can be seen in the present embodiment, the collar portion of a collared nut 68, upon insertion of the nut 68 into a hollow cylindrical boss 63, will get engagement with the end face of a hollow cylindrical boss 63 or 75, thereby preventing a cracking which will possibly occur on the end face. However, it is also possible to use other type of nut without a collar portion. In addition, directly inserted into a hollow cylindrical boss 63 or 75 may also be a bolt 69 instead of a nut 68. If a bolt is inserted into a hollow cylindrical boss, it is preferred that such bolt be formed with a collar portion. Finally, when a collared nut or a collared bolt is inserted into a hollow cylindrical boss, it is also allowed to employ an ultrasonic pressing method instead of a heat-pressing method.

Although the above description has been given in relation to tilting type window device such as a sunroof for use in a motor vehicle, the structures according to the present invention may also be used in a rear quarter window or a rear window in an automobile vehicle.

What is claimed is:

1. A window device for use in a motor vehicle, comprising:

a resin window panel having at least one boss portion vertically formed thereon;

a reinforcing member having at least one through hole;

at least one pair of mutually threadingly engageable male member and female member, one of which is fixed in the at least one boss formed integrally with the resin window panel, the other of which is threaded to the above one member through the hole formed in the reinforcing member, so that the reinforcing member is interposed between two engaging faces of the male and female members;

a shoulder portion being formed on either the male member or the female member for maintaining a constant interval between the two engaging faces of the male and female members.

2. The window device according to claim 1, wherein the above one member fixed in the boss of the resin window panel has a collar portion engageable with an end face of the boss.

3. The window device according to claim 2, wherein the above one member fixed in the boss of the resin window panel has a cylindrical portion covering an outer surface of the boss.

4. The window device according to claim 1, wherein the at least one boss of the resin window panel is a hollow cylindrical boss.

5. The window device according to claim 1, wherein the at least one boss of the resin window panel is a solid cylindrical boss.

* * * * *